Figures 1, 2, 3, 4, 5, 6, 7:
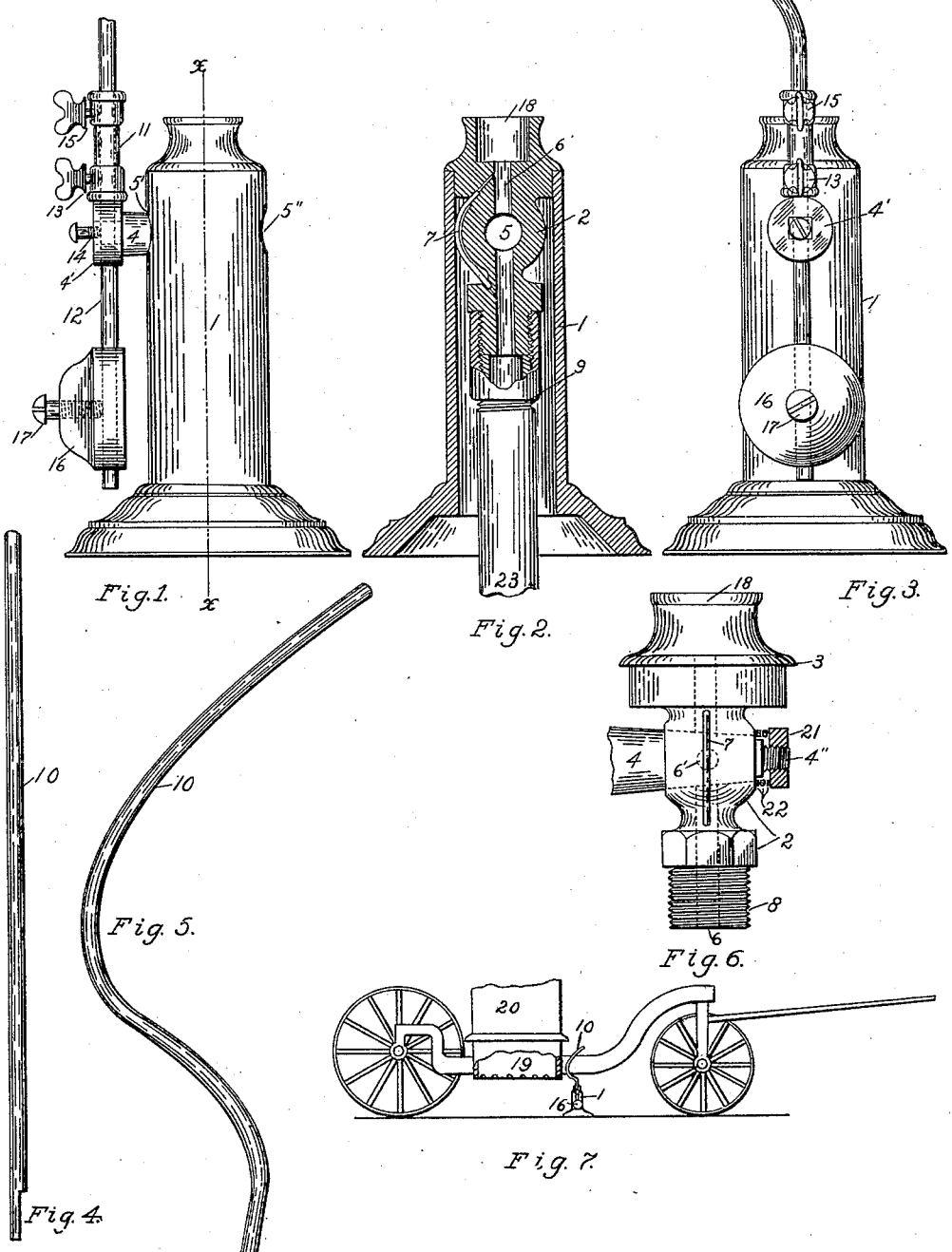

No. 696,438. Patented Apr. 1, 1902.
H. W. HINES.
FIRE KINDLER FOR FIRE ENGINES.
(Application filed Dec. 4, 1901.)
(No Model.)

WITNESSES:
B. G. La Bar.
D. G. Moran.

INVENTOR,
Henry W. Hines
BY D. B. Replogle
ATTORNEY

THE NORRIS PETERS CO., PHOTO-LITHO., WASHINGTON, D. C.

UNITED STATES PATENT OFFICE.

HENRY W. HINES, OF SCRANTON, PENNSYLVANIA.

FIRE-KINDLER FOR FIRE-ENGINES.

SPECIFICATION forming part of Letters Patent No. 696,438, dated April 1, 1902.

Application filed December 4, 1901. Serial No. 84,636. (No model.)

*To all whom it may concern:*

Be it known that I, HENRY W. HINES, a citizen of the United States, residing at Scranton, in the county of Lackawanna and State of Pennsylvania, have invented certain new and useful Improvements in Fire-Kindlers for Fire-Engines, of which the following is a specification, reference being had therein to the accompanying drawings.

This invention relates to fire-kindlers, such as are adapted to be used in connection with fire-engines for emergency use; and the objects of the invention are to provide an automatic fire-kindler for fire-engines, to adapt such fire-kindlers to be used with common gas, to provide a powerful blaze at the proper moment without wasting gas, to secure such kindlers in a suitable position, and to improve them in form and efficiency generally.

To these ends the invention consists of the construction, arrangement, and combination of the several parts, as herein specified, and set forth in the accompanying drawings, in which—

Figure 1 is a front elevation of a fire-kindler constructed according to my invention, the top part of the arm being broken away. Fig. 2 is a partial cross-section taken on the line *x x* of Fig. 1, the turn-valve being removed. Fig. 3 is a view of my fire-kindler, taken at right angles to that of Fig. 1. Fig. 4 is a front view of the arm, partially broken away in Fig. 1; and Fig. 5 is a view of the said arm, taken at right angles to that shown in Fig. 4. Fig. 6 is an enlarged detail view of the essential parts of the valve used in my device. Fig. 7 is a comprehensive view showing the mode of using the device.

Similar characters of reference denote like and corresponding parts throughout the several views.

Referring to the drawings, 1 designates a tubular-shaped standard arranged to stand upon the floor of the place where the fire-engine is to be kept and is primarily for the purpose of supporting the valve member 2, which is connected to a gas-pipe 23, leading from any suitable main or gas reservoir from under the floor of the place where it is to be used. The member 2 is slid into the tubular standard 1 until the flange 3 rests on the rim thereof, and the valve member 4 is then inserted into its opening 5 through side openings 5' 5" of the standard 1 and is secured therein by a nut 21, run onto the threaded shank 4" and compressing a spring gasket or washer 22, whereby the member 4 is held securely into its position, a bore 6' through it being capable of being turned into line with the bore 6, extending through the member 2 aforesaid. A small tube 7 is arranged to make a passage leading around the valve, so that when the valve is shut off a small quantity of gas is allowed to continuously escape around the valve by means of the said tube 7. The member 2 is connected to the gas-pipe 23 by means of a coupling 9, connecting the threaded shank of the pipe 23 with the threaded shank 8 of the member 2. An arm 10, suitably curved, is secured into the sleeve 11 by means of a set-screw 15, and the said sleeve is further secured by means of a set-screw 13 to the rod 12, which rod 12, bearing a counterweight 16, extends through the hub 4', integrally made with the valve member 4, the said rod 12 being secured thereto by a suitable set-screw 14 and having its counterweight 16 shiftable thereon and capable of being secured at the proper points by means of a suitable set-screw 17. The upper end of the member 2 is also hollowed out at 18, so as to form a guard to prevent the flame maintained by the escaping gas from being blown out.

The method of using the device is apparent. It should be secured to the floor at a point directly in front of the box of the fire-engine with which it is to be used when the said engine is standing in its accustomed place, the rounded part of the arm 10 extending in the direction of the said fire-box and the adjustment of the arm and weight 16 with reference to the operating-valve 4 being such that when the counterweight 16 hangs vertically downward the gas is turned off, save that which escapes through the small tube 7, by which a small flame is fed at the upper end of the bore 6. Now it is apparent that as the fire-engine is moved forward the arm 10 is tilted over at right angles or substantially horizontal position, whereby the bore 6' through the member 4 is brought in line with the bore 6, and a full supply of gas is permitted to escape and to be ignited by the small flame before mentioned. As this occurs the grating 19 of the engine 20 passes directly over the upward-shooting flame, and the kindling placed therein is not only lighted, but rapidly fired to a high state of combustion during the passage of the engine over it.

I do not wish to be confined to the exact construction of the several parts as described, as it is evident that many of them may be varied without departing from the general spirit of my invention.

What I do claim, and desire to secure by Letters Patent, is—

1. The herein-described fire-kindler for fire-engines comprising a standard, a gas-pipe, a turn-valve supported therein and having connection with said gas-pipe, a gas-supply, an arm extending upward from the turn-valve aforesaid, and an arm extending downward bearing a weight, the said weight adapted to hold the said turn-valve normally closed, and the arm extended upward arranged to be turned over by the fire-box of an engine passing over it, whereby the said turn-valve is operated, substantially as and for the purpose specified.

2. A fire-kindler for fire-engines comprising a gas-pipe, said pipe leading to a valve secured by a standard, and a small passageway connected with the pipe above and below the valve aforesaid arranged to support a flame above the valve, a turn-cock arranged therein, and counterbalanced so as to remain normally closed, and provided with an arm extended upward and arranged to come in contact with the fire-box of an engine when it passes thereover, substantially as and for the purpose specified.

3. In a fire-kindler of the kind described, the combination with a gas-pipe, of a gas-tube, a valve controlling the flow therethrough, and a small tube having conjunction with the main tube above and below the said valve, whereby a small quantity of gas may escape around the valve, and means for automatically opening the valve when the engine passes thereover, substantially as and for the purpose specified.

4. In a fire-kindler of the kind described, the combination with a main gas-supply pipe leading to a valve member, a standard arranged to support said valve member, a small tube arranged to conduct a flow of gas around the valve in the said valve member, and to be lighted in the vicinity of the mouth or opening of the main supply-pipe aforesaid, and means for automatically operating the said valve for the purpose of controlling the flow of gas through the main supply-pipe, substantially as and for the purpose specified.

In testimony whereof I affix my signature in presence of two witnesses.

HENRY W. HINES.

Witnesses:
D. G. MORAN,
B. G. LA BAR.